O. BERG.
PROCESS OF SIMULTANEOUSLY SCRAPING OFF AND GRANULATING SUBSTANCES.
APPLICATION FILED JULY 9, 1914.
1,137,181.
Patented Apr. 27, 1915.
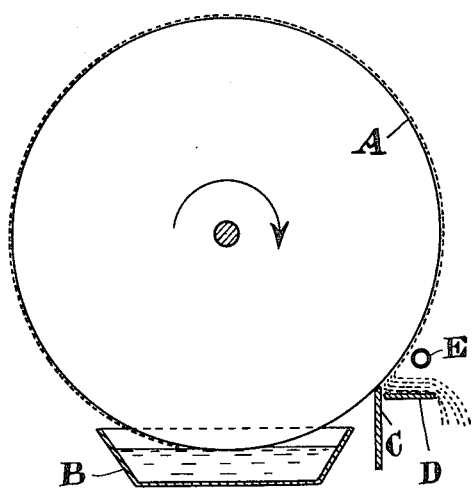

UNITED STATES PATENT OFFICE.

OLAF BERG, OF RJUKAN, NORWAY, ASSIGNOR TO NORSK HYDRO-ELEKTRISK KVAELSTOFAKTIESELSKAB, OF CHRISTIANIA, NORWAY.

PROCESS OF SIMULTANEOUSLY SCRAPING OFF AND GRANULATING SUBSTANCES.

1,137,181.  Specification of Letters Patent.  Patented Apr. 27, 1915.

Application filed July 9, 1914. Serial No. 849,967.

*To all whom it may concern:*

Be it known that I, OLAF BERG, a subject of the King of Norway, residing at Rjukan, Norway, have invented certain new and useful Improvements in Processes of Simultaneously Scraping Off and Granulating Substances; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a process of simultaneously scraping off and granulating substances especially nitrate of lime and the like the solidification or drying of which has been effected on the surface of drums.

Several substances such as for instance nitrate of lime are at present for the greater part pulverized by the use of ball mills, disintegrators and similar apparatus, whereby a great part of the material is obtained as a flour. When the material in question is used in this form as a fertilizer it is usually a great inconvenience because, when being spread on the fields, it will attach itself to and soil the clothes of the workers and, when the substance is of a hygroscopic character, will become sticky. While spreading on the fields in windy weather it will also make much dust, whereby considerable quantities are lost.

The present invention now has for its object a process, by means of which it is made possible to granulate, and not pulverize such substances, so that flour is not produced to any considerable extent.

In the following the invention is described in its application to the pulverizing of nitrate of lime.

The lye of nitrate of lime which has been obtained by a previous treatment in known manner is finally brought upon solidifying drums, where it hardens to a solid mass. The hardened mass is then scraped off by means of knives whereby it is loosened in large pieces, the so called "leaf-saltpeter." These pieces are passed against an adjustable flat fillet of wood or a metal, which is arranged at a suitable angle to the scraper knife and the solidifying drum and at suitable distance therefrom. The pieces of saltpeter, which are scraped off the drum, are broken up to a granular powder at the same time they leave the said drum. By this method of granulation a product is obtained, which is practically free from flour. Especially in connection with nitrate of lime it has been proved that it is preferable to have the material in a somewhat tough condition, at the moment it is scraped off. To prevent the particles of the granulated mass from sticking together, which may occur if the mass is not sufficiently cooled, it may under certain conditions be of advantage to provide an arrangement such as a perforated tube or the like, through which cooled gases or air flow in the proximity of the pulverizing fillet. This current of air will cool the mass sufficiently to prevent the particles from sticking together.

In the accompanying drawing an arrangement for carrying the present invention into effect is diagrammatically illustrated.

A is the solidifying drum which on revolving comes in contact with the liquid saltpeter in the channel B. The thin layer of saltpeter, which by this contact will stick to the drum, hardens before it has reached the knife C. The knife C scrapes the mass off the drum, and the pieces of material are pressed against the adjustable fillet D. This fillet which may be constructed for instance of wood or of a metal is adjustable in all directions, so that it could easily be placed at a suitable angle in relation to the drum and knife and at a suitable distance therefrom.

E is an arrangement for the supply of air when necessary.

It is obvious that by working in this manner important advantages are obtained over the known methods. As already mentioned the unfavorable formation of flour is avoided. Another important advantage exists in that the number of pulverizing apparatus is considerably reduced, because at most only about 10 per cent. of the mass scraped off needs to be subjected to a subsequent pulverization treatment. Hence a considerable economy in the cost of the plant and in the manufacturing costs is obtained and this again effects a corresponding increase in profits.

I claim:

1. In the method of granulating material of the character described which consists in drying and hardening the material in a thin sheet on a moving surface, causing the material to be scraped and deflected from said surface thereby changing its direction of movement as it leaves said surface and to simultaneously break it from the sheet on said surface in flakes, and immediately thereafter forcing the material to again change its direction of movement and thereby breaking up the flakes.

2. In the method of granulating material of the character described which consists in drying and hardening the material in a thin sheet on a moving surface, causing the material to be scraped and deflected from said surface thereby changing its direction of movement as it leaves said surface and to simultaneously break it from the sheet on said surface in flakes, immediately thereafter changing the direction of movement of the flaked material by crowding the latter against a directing surface at an angle to the direction of movement of the flaked material sufficient to cause the granulation of the flakes.

3. The method of granulating material of the character described, which consists in drying and hardening the material in a thin sheet on a moving surface, scraping the surface to remove the hardened material in flakes, causing the flakes to collect at the point of removal on a directing surface positioned at an angle to the drying surface, thereby causing a compression of the flakes sufficient to granulate the latter.

4. The method of granulating material of the character described, which consists in drying and hardening the material in a thin sheet on a moving surface, scraping the surface to remove the hardened material in flakes, causing the flakes to collect at the point of removal on a directing surface positioned at an angle to the drying surface, thereby causing a compression of the flakes sufficient to granulate the latter, and subjecting the granulated material to a current of air.

In testimony that I claim the foregoing as my invention I have signed my name in presence of two subscribing witnesses.

OLAF BERG.

Witnesses:
M. E. GUTLOVMSEN,
RUTH LINDSTRÖM.